United States Patent
Kornmann et al.

(10) Patent No.: US 8,832,223 B1
(45) Date of Patent: Sep. 9, 2014

(54) VIEW BASED STREAMING OF GIS DATA

(75) Inventors: David Kornmann, Sunnyvale, CA (US); John Rohlf, Truckee, CA (US)

(73) Assignee: Google, Inc., Mt. View, CA (US)

( * ) Notice: Subject to any disclaimer, the term of this patent is extended or adjusted under 35 U.S.C. 154(b) by 327 days.

(21) Appl. No.: 13/028,458

(22) Filed: Feb. 16, 2011

Related U.S. Application Data

(60) Provisional application No. 61/305,208, filed on Feb. 17, 2010.

(51) Int. Cl.
*G06F 15/16* (2006.01)
(52) U.S. Cl.
USPC .......... 709/217; 709/218; 709/219; 709/201; 709/203; 709/231; 709/236
(58) Field of Classification Search
USPC .................. 709/217–219, 201–203, 231, 236
See application file for complete search history.

(56) References Cited

U.S. PATENT DOCUMENTS

| | | | |
|---|---|---|---|
| 6,789,075 B1* | 9/2004 | Nielsen | 1/1 |
| 2002/0073167 A1* | 6/2002 | Powell et al. | 709/217 |
| 2007/0130525 A1* | 6/2007 | Murphy et al. | 715/747 |
| 2008/0016472 A1* | 1/2008 | Rohlf et al. | 715/848 |

* cited by examiner

*Primary Examiner* — Wing F Chan
*Assistant Examiner* — Padma Mundur
(74) *Attorney, Agent, or Firm* — Dority & Manning, P.A.

(57) ABSTRACT

Systems, methods and articles of manufacture for view based streaming of geographical information system (GIS) data are described herein. An embodiment includes assigning priority values to cache nodes based on a current view of GIS data, reordering cache node requests based on the assigned priority, aggregating the reordered cache node requests into aggregated requests and providing the aggregated requests to a content server to retrieve cache nodes that fulfill the requests. Another embodiment includes receiving cache nodes in response to requests for a frame of data, wherein the cache nodes are associated with a requested view of GIS data, reviewing a priority value assigned to each requested cache node, determining cache nodes that are relevant to a current view and discarding cache nodes based on said determining step.

15 Claims, 6 Drawing Sheets

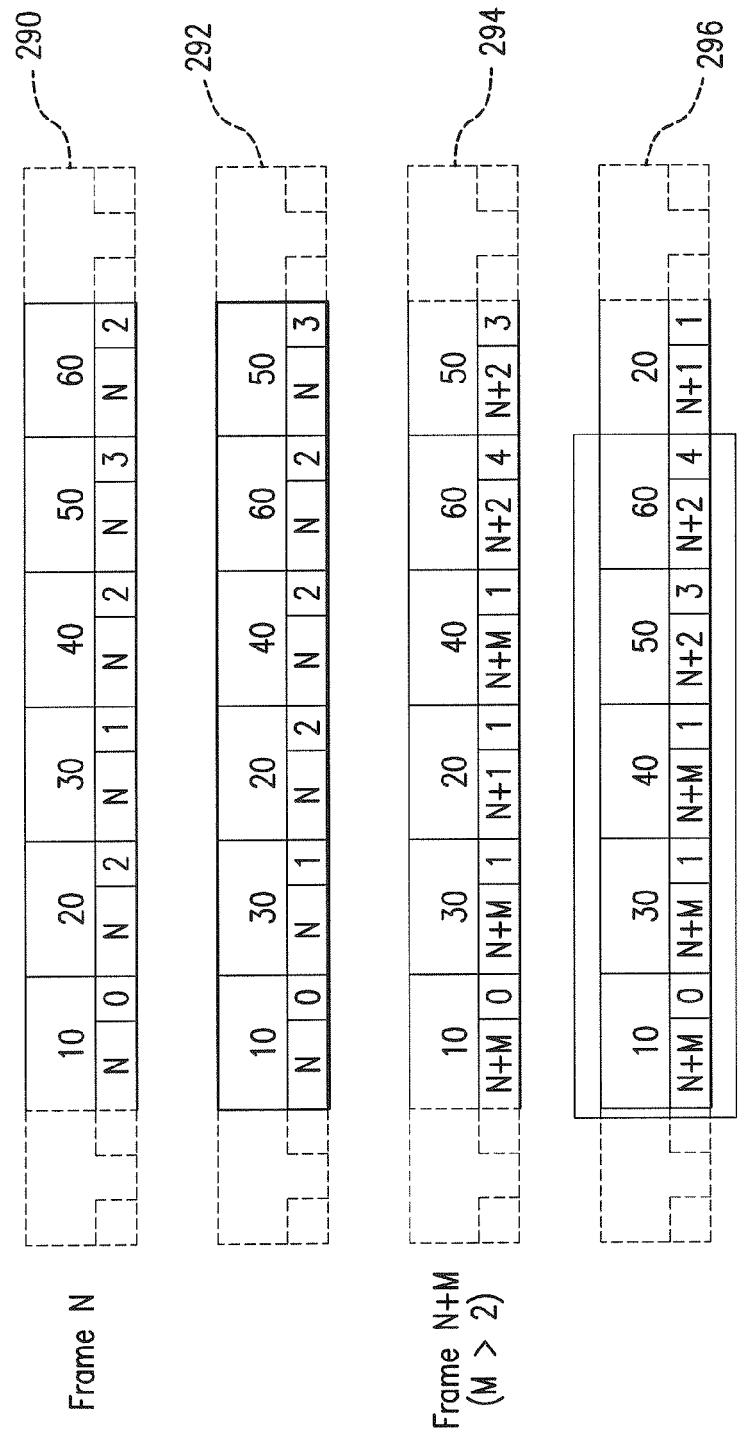

VIEW BASED STREAMING OF GIS DATA

CROSS-REFERENCE TO RELATED APPLICATION

This patent application claims the benefit of U.S. Provisional Patent Application No. 61/305,208, filed Feb. 17, 2010 entitled "View Based Streaming of GIS Data," which is incorporated herein by reference in its entirety.

BACKGROUND

1. Field

Embodiments relate to geographical information systems (GIS), and particularly to streaming of GIS data.

2. Background

A geographical information system (GIS) can be used to store, analyze, and display geographical information and map data. Although GIS applications are generally implemented on standalone or desktop systems, they are also being implemented on mobile devices in the form of mobile GIS applications.

Usability of such GIS applications depends on rendering and displaying content quickly and smoothly. Mobile devices have limited network, memory, and processing resources. Thus, given these limitations, rendering dynamic content (e.g. terrain views or map views) on mobile devices can be challenging.

GIS applications may communicate with a server to retrieve data that is requested for display on the mobile device. For example, a GIS application may request data from a server to update a terrain view being displayed on the mobile device. However, once such a request is made and is being transmitted to the server, a user action may request an update to the terrain view before the initially requested data is returned by the server. Thus, the server may return data that is no longer relevant to a view that is being requested. Because the data returned by the server is no longer relevant to the view that is being requested, the mobile device may receive and process data that is no longer relevant to a current view, thereby wasting valuable and limited mobile device processing resources.

BRIEF SUMMARY

Embodiments relate to view based streaming of GIS data at a device. An embodiment includes assigning priority values to cache nodes based on a current view of GIS data, reordering cache node requests based on the assigned priority, aggregating the reordered cache node requests into aggregated requests and providing the aggregated requests to a content server to retrieve cache nodes that fulfill the requests. Another embodiment includes receiving cache nodes in response to requests for a frame of data, wherein the cache nodes are associated with a requested view of GIS data, reviewing a priority value assigned to each received cache node, determining cache nodes that are relevant to a current view based on priority values and discarding cache nodes based on said deter mining step.

Further embodiments, features, and advantages of the embodiments, as well as the structure and operation of the various embodiments are described in detail below with reference to accompanying drawings.

BRIEF DESCRIPTION OF THE DRAWINGS

Embodiments are described with reference to the accompanying drawings. In the drawings, like reference numbers may indicate identical or functionally similar elements. The drawing in which an element first appears is generally indicated by the left-most digit in the corresponding reference number.

FIG. 2B is a diagram illustrating exemplary cache node priorities, according to an embodiment.

DETAILED DESCRIPTION

Figure 1:
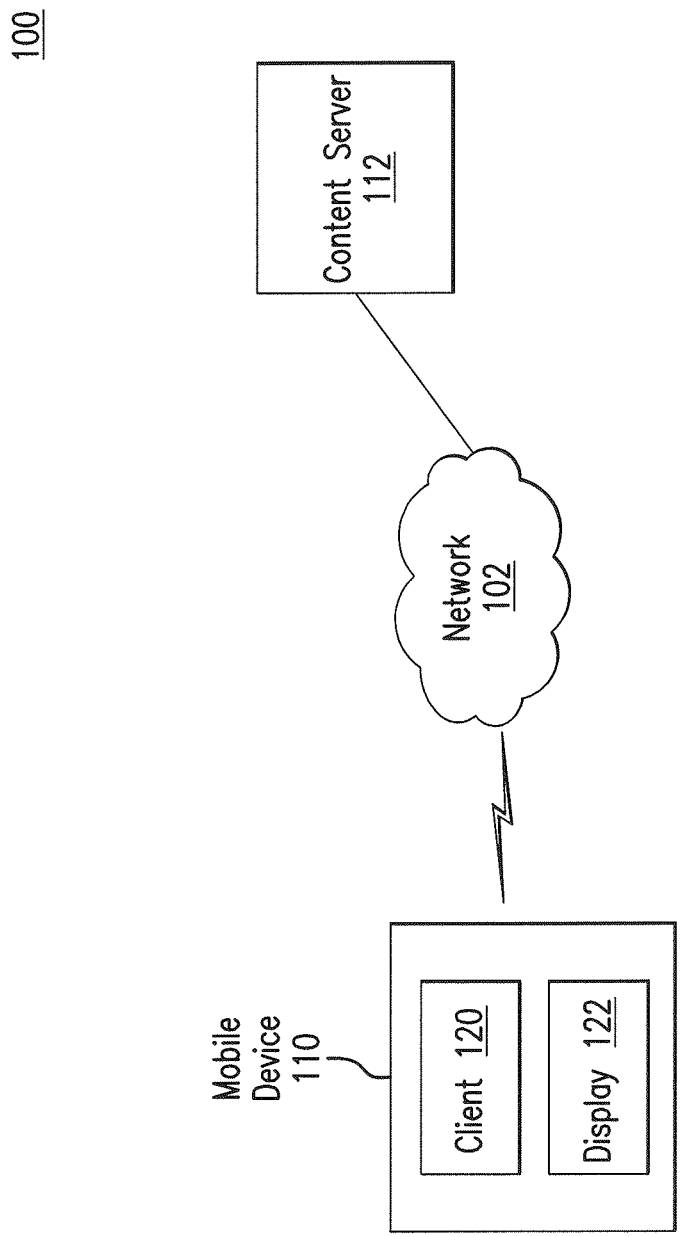
FIG. 1 illustrates a system for view based streaming, reordering and processing of GIS data, according to an embodiment.

Embodiments relate to view based streaming and processing of GIS data on mobile device. As discussed above, an embodiment includes assigning priority values to cache nodes based on a current view of GIS data, reordering cache node requests based on the assigned priority, aggregating the reordered cache node requests into aggregated requests and providing the aggregated requests to a content server to retrieve cache nodes that fulfill the requests. Another embodiment includes receiving cache nodes in response to requests for a frame of data, wherein the cache nodes are associated with a requested view of GIS data, reviewing a priority value assigned to each requested cache node, determining cache nodes that are relevant to a current view and discarding cache nodes based on said determining step.

In this way, even if a content server returns cache nodes that are no longer relevant to a view that is being displayed or requested, a mobile device processes and renders cache nodes that most relevant to a current view, thereby saving valuable and limited mobile device processing resources. Thus, processing at the mobile device is more efficiently directed to GIS data of most interest to a current view.

While the present embodiments are described herein with reference to illustrative applications, it should be understood that the embodiments are not limited thereto. Those skilled in the art with access to the teachings provided herein will recognize additional modifications, applications, and embodiments within the scope thereof and additional fields in which the embodiments would be of significant utility. The term 'streaming' as used herein refers to any form of connectionless or connection based exchange of data (e.g. data exchange between a client and a server). Such a form of data exchange may be in a predefined sequence or even out of sequence. The term 'view' as used herein refers to any form of three dimensional (3D) scene that may be displayed on a display. For example, such a view may be associated with 3D imagery of the Earth and other geospatial data.

In an embodiment, system 100 includes mobile device 110, content server 112 and network 102. Mobile device 110 can be any computing (or processing) device having one or more processors. For example, mobile device 110 can be a workstation, computer, cluster of computers, set-top box, or other device having at least one processor and an ability to communicate wirelessly and/or over a wired network. Such a processing device may include software, firmware, hardware, or a combination thereof. Software may include one or more applications and an operating system. Hardware can include, but is not limited to, a processor, memory and graphical user interface display. In an embodiment, mobile device 110 can support graphics processing and rendering. Such a device can include, but is not limited to, a mobile phone that can support email and all forms of Internet and World Wide Web (WWW) communication. In an embodiment, mobile device 110 includes client 120. The operation of client 120 is described further below.

In an embodiment, content server 112 can be a server that includes any form of geographic data, map data, astronomical data (e.g. lunar terrain) and oceanic data. In an embodiment, content server 112 may be a GIS server. Such a GIS server may be configured to bring images of the Earth and other geospatial data to client 120 for viewing by a user. Together, the images of the Earth and other geospatial data may form a three dimensional model in a three dimensional environment. Content server 112 may also include audio, video, text and any other form of data. As a purely illustrative and non-limiting example, content server 112 can be a database or repository implemented on a server (or computing device). Such a content server can be a workstation, mobile device, computer, cluster of computers, set-top box, or other device having at least one processor. Such a processing device may include software, firmware, hardware, or a combination thereof. Software may include one or more applications and an operating system. Hardware can include, but is not limited to, a processor, memory and graphical user interface display.

In an embodiment, network 102 may include one or more networks, including but not limited to, a local area network, medium-area network, and/or wide-area network, such as the Internet. Network 102, for example, may be any form of wired or wireless network that allows mobile device 110 and content server 112 to communicate with each other. In addition, network 102 can be a Bluetooth based personal area network (PAN). Bluetooth is known to those skilled in the art and is an open wireless protocol for exchanging data over short distances from fixed and mobile devices.

In an embodiment, mobile device 110 can communicate with content server 112. For example, mobile device 110 may retrieve content (e.g., GIS data) from content server 112 and display the retrieved content using a display 122. In an embodiment, mobile device 110 provides Hyper Text Markup Language (HTTP) requests for GIS data to content server 112 and receives HTTP responses that include the requested GIS data from content server 112. In another embodiment, not intended to limit the invention, content server 112 may 'push' or provide GIS content to mobile device 110 based on updates to content at content server 112.

Figure 2A:
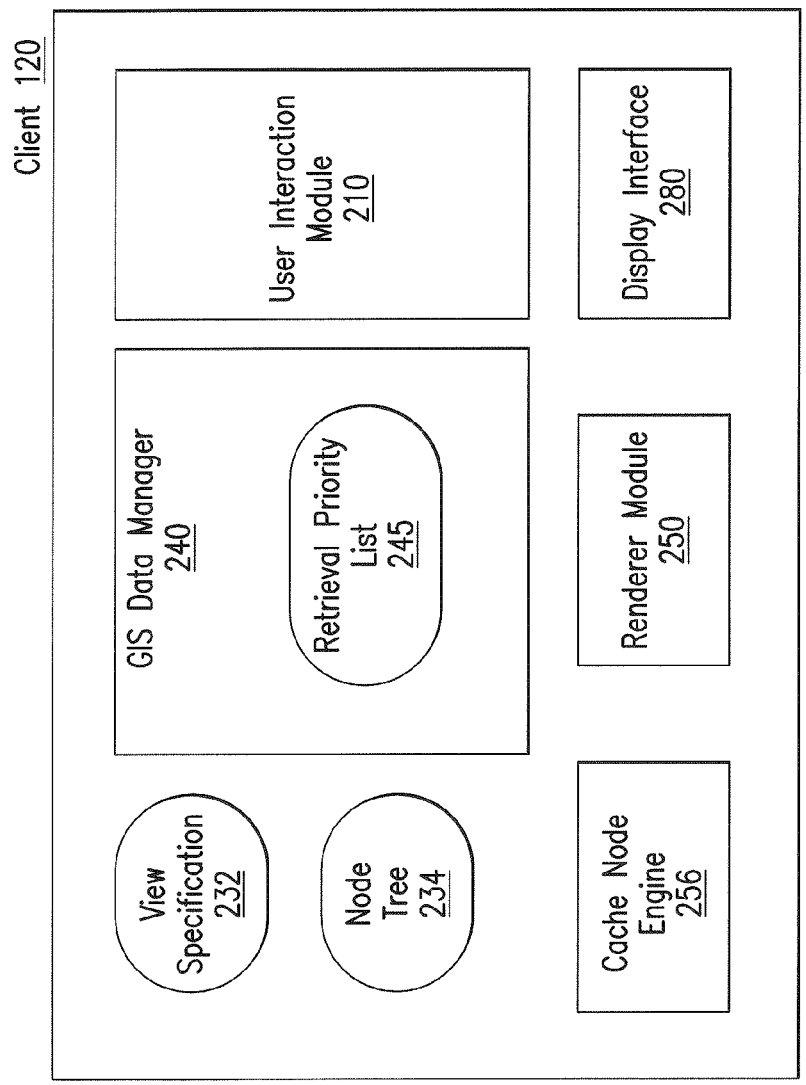
FIG. 2A illustrates a diagram of a client, according to an embodiment.

FIG. 2A is an architecture diagram of an exemplary client 120, according to an embodiment. In an embodiment, client 120 includes a user interaction module 210, GIS data manager 240, renderer module 250, and display interface 280, view specification 232 and node tree 234 and cache node engine 256. GIS data manager 240 includes a retrieval priority list 245.

In an embodiment, client 120 interacts with content server 112 to bring images of the Earth and any other geospatial, astronomical and oceanic data to client 120 for viewing by a user. Together, the images of the Earth and other geospatial data form a three dimensional model in a three dimensional environment which may be displayed on display 122.

In a non-limiting embodiment, client 120 operates as follows. User interaction module 210 receives user input regarding a location or region that a user desires to view and, constructs view specification 232. In an embodiment, a user inputs location information using a graphical user interface (not shown) of client 120 on mobile device 110. This results, for example, in the generation of view specification 232. In an embodiment, view specification 232 may be placed in a local client memory (not shown), where it is used by renderer module 250. In an embodiment, renderer module 250 uses view specification 232 to render data for display on display 122 using display interface 280.

In an embodiment, cache node engine 256 builds node tree 234 by populating it with quad nodes based on the view specification 232. As a non-limiting example, a quad node is a data structure that may have a payload of data (e.g. GIS data) and up to four references to other files, each of which in turn may be a quad node. The files referenced by a quad node are referred to as the children of that quad node, and the referencing quad node is referred to herein as the parent. In some cases, a file contains not only the referenced child, but descendants of that child as well. These aggregates are known as cache nodes and may include several quad nodes. Cache nodes may represent pieces of data that the client 120 needs to resolve the current 3D view.

In an embodiment, at every view (or displayed frame), GIS data manager 240 sends requests (e.g. HTTP requests) for GIS data to content server 112 managing GIS data. In an embodiment, cache nodes that are not stored on disk cache are sorted by priority and batched together in large HTTP requests. By the time the HTTP responses are received, the cache nodes' priority may have changed. The responses are sorted by relevance to the current 3D view requirements and may be processed in that order. In an embodiment, such requests are made for cache nodes prioritized by GIS data manager 240 for a current view. In an embodiment, GIS data manager 240 assigns each cache node an initial cache node priority at the time of the request. In an embodiment, GIS data manager 240 constructs retrieval priority list 245 which includes a list identifying cache nodes and their respective priority values. In an embodiment, GIS data manager 240 sorts (or reorders) data requests based on the initial cache node priority stored in retrieval priority list 245 and aggregates the sorted data requests in cache node queries sent to content server 112.

According to an embodiment, data responses received from content server 112, to fulfill the queries, are reordered by GIS data manager 240 based on the relevancy to the then current view. As an example, this current view may be several hundred frames later then the view for the initial frame of the initial request. In an embodiment, whenever a view is updated (e.g. by a user), GIS data manager 240 updates retrieval priority list 245 based on the updated view. As an example, an update to a view can be determined by GIS data manager 240 by reviewing view specification 232. In an embodiment, data responses received from content server 112 may be reordered by GIS data manager 240 based on current cache node priority values in retrieval priority list 245 for the current view. Thus, in an embodiment, GIS data manager 240 determines higher and lower priority cache nodes in the responses by reviewing retrieval priority list 245.

In an embodiment, lower priority responses may be even discarded by GIS data manager 240. In this way, even if content server 112 returns data (e.g. cache nodes) that is no longer relevant to a view that is being displayed or requested, mobile device 110 processes and renders data that most relevant to a current view, thereby saving valuable and limited mobile device processing resources. In this way, processing at mobile device 110 is more efficiently directed to GIS data of most interest to a current view.

FIG. 2B is a diagram illustrating an exemplary retrieval priority list 245 according to a non-limiting embodiment. In an embodiment, such a retrieval priority list can include cache node identifiers as well as a priority value assigned to each cache node.

Diagram 290 illustrates a list of cache nodes for frame N that were gathered during scene traversal (or node tree creation) for download from content server 112. As illustrated in diagram 290, the cache nodes may have cache node identifiers (e.g., 10, 20, 30, etc.) associated with them. Such identifiers are not limited to numeric values and any other identifier or label (e.g. alphanumeric, text, etc.) may be used. As an example, 'N' represents the frame at which a cache node was last touched (or used) and is known as a frame index. A cache node may have any other frame index (e.g. N+1, N+2, etc.) depending on when the cache node was last touched or used by a frame. As shown in diagram 290, based on the scene traversal, a priority value is assigned to each node (e.g., 0, 2, 1, etc.) based on its relevance to the scene. A cache node may have any other priority value (e.g., 5, 6, 7 etc.) depending on scene traversal by client 120. For example, a cache node may be assigned a higher priority value (e.g., 0) if it is required by a specific frame (e.g., frame N) in a scene.

Diagram 292 illustrates cache nodes of diagram 240 that are sorted based on priority values and are batched into aggregated HTTP requests. As shown in diagram 292, the nodes from diagram 290 have been sorted so that their priority values are in a decreasing order. As an example, a priority value of '0' indicates highest priority and priority values of 1, 2 and 3 etc. indicate lower priorities. It is to be appreciated that cache nodes may also be sorted in increasing values of priority. In addition, in diagram 292, cache nodes have been aggregated into groups of three nodes per group. Such a grouping depends on the type of data being requested from content server 112. For example, cache node requests may be grouped into larger aggregate groups when the data to be retrieved from content server 112 is larger in size (e.g. image tiles) and may be grouped into smaller aggregate groups when the data to be retrieved from server 112 is smaller in size (e.g. geographic data points). In this way, the size of the aggregated cache node requests can be modified by GIS data manager 240 based on the type of data to be retrieved from content server 112.

Diagram 294 illustrates exemplary retrieval priority list 245 'M' frames after frame N. After M frames, some cache nodes may longer be needed by a current frame displayed on mobile device 110 (i.e. frame N+M) and other cache nodes may have their priority values changed. Also, as shown in diagram 294, some cache nodes are associated with a frame index of N+1 or even N+2. For example, if a cache node is associated with frame N+1 then the cache node was required by frame N+1 but may not needed for the current frame (i.e. frame N+M). As shown in diagram 296, after receiving the HTTP responses the cache nodes are sorted by GIS data manager 240 using a current priority and last touch (or use) frame index (i.e. N+M, N+1, etc.).

In an embodiment, the cache nodes can be processed based on the sorting and last touch frame index. In an embodiment, if the last frame at which the cache nodes were touched is older than a pre-determined threshold, that cache node may be determined to be obsolete and can be discarded by GIS data manager 240. For example, referring to diagram 296, cache nodes having cache node identifiers of 10, 30, 40, 50 and 60 may be retained for further processing and other nodes may be discarded. In an embodiment, cache nodes may be further processed by client 120 based on decreasing priority values.

Figure 3:
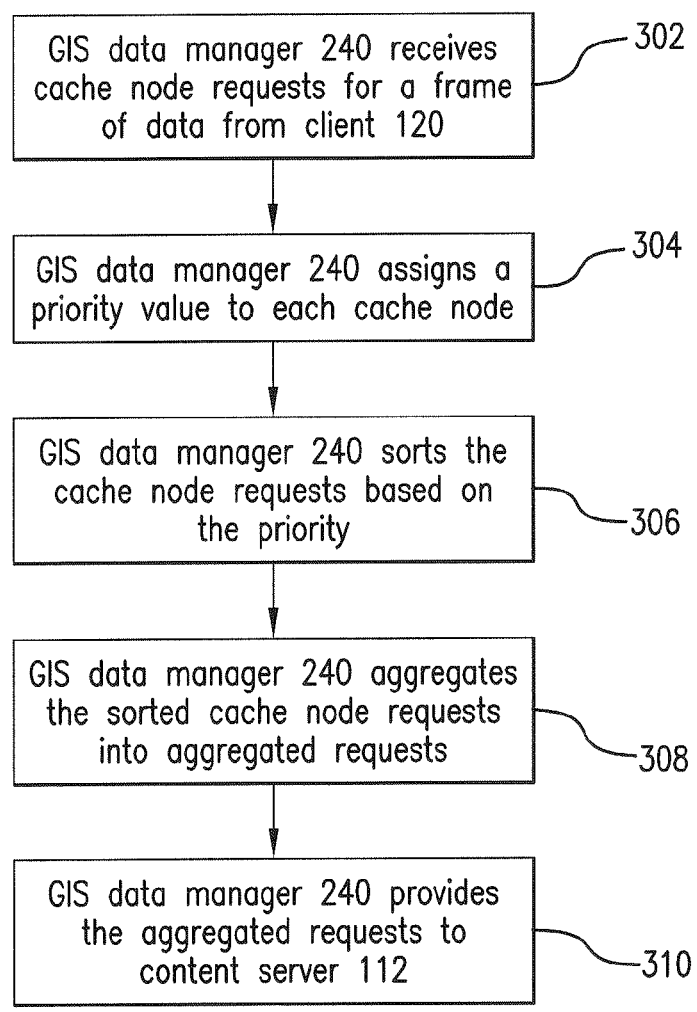
FIG. 3 is a flowchart illustrating an exemplary request operation of a GIS data manager, according to an embodiment.

FIG. 3 is a method 300 illustrating an exemplary request operation of GIS data manager 240, according to an embodiment.

Method 300 begins with GIS data manager 240 receiving cache node requests for a frame of data from client 120 (step 302).

GIS data manager 240 assigns a priority value to each cache node included in request of step 302 (step 304). As an example, GIS data manager 240 assigns each cache node an initial cache node priority at the time of the request. Furthermore, GIS data manager 240 may store a list identifying the cache nodes and their respective priority values in retrieval priority list 245.

GIS data manager 240 reorders the cache node requests based on the priority assigned in step 304 (step 306). As an example, GIS data manager 240 sorts (or reorders) data requests based on the initial cache node priority stored in retrieval priority list 245.

GIS data manager 240 aggregates the reordered cache node requests into aggregated requests (step 308) and provides the aggregated requests to content server 112 (step 310). As an example, at every view (or displayed frame), GIS data manager 240 sends the aggregated requests (e.g. HTTP requests) for GIS data to content server 112 managing GIS data.

In an embodiment, not intended to limit the invention, GIS data manager 240 may continually update retrieval priority list 245 in response to frame or view updates at client 120. For example, a user action may request an update to a terrain view before previously requested data is returned by the server. In this scenario, GIS data manager 240 updates retrieval priority list 245 to reflect any changes to the updated terrain view. In this way, GIS data manager 240 maintains retrieval priority list 245 that is consistent with the current view displayed (or requested) on display 120.

Figure 4:
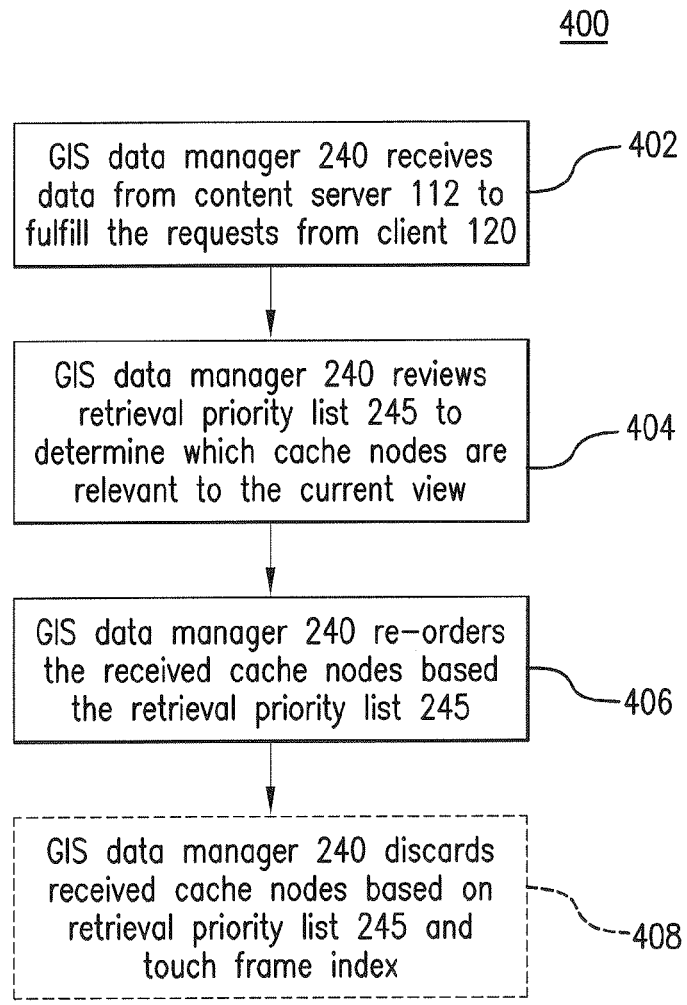
FIG. 4 is a flowchart illustrating an exemplary response operation of a GIS data manager, according to an embodiment.

FIG. 4 is a method 400 illustrating an exemplary response operation of GIS data manager 240, according to an embodiment.

Method 400 begins with GIS data manager 240 receiving data from content server 112 to fulfill the requests from client 120 (step 402). As an example, GIS data manager 240 receives cache nodes from content server 112.

GIS data manager 240 then reviews retrieval priority list 245 to determine which cache nodes are relevant to the current view (step 404) and re-orders the received cache nodes based on retrieval priority list 245 (step 406). As discussed above, GIS data manager 240 may continually update retrieval priority list 245 in response to frame or view updates at client 120. In this way, GIS data manager 240 maintains retrieval priority list 245 that is consistent with the current view displayed (or requested) on display 120. As shown in diagram 246, after receiving the HTTP responses the cache nodes are sorted by GIS data manager 240 using a current priority and last touch (or use) frame index. As an example, such a touch frame index may be stored in retrieval priority list 245. In an embodiment, the cache nodes can be processed based on the sorting and last touch frame index.

GIS data manager 240 may then discard received cache nodes that may not be on the retrieval priority list 245 or if the received cache nodes have a lower priority value (step 408). In an embodiment, if the last frame at which the cache nodes were touched is older than a pre-determined threshold, that cache node may be determined to be obsolete and is discarded by GIS data manager 240. As an example, the cache nodes that are not discarded (or are most relevant to a current view) are provided added to node tree 234 by cache node engine 256. This results in an update to view specification 232. As discussed above, renderer module 250 uses view specification 232 to render a view on display 122 using display interface 230. In this way, even if content server 112 returns cache node that are no longer relevant to a view that is being displayed or requested, mobile device 110 processes and renders cache nodes that most relevant to a current view, thereby saving valuable and limited mobile device processing resources. In this way, processing at the mobile device is more efficiently directed to GIS data of most interest to a current view.

Example Computer Embodiment

Figure 5:
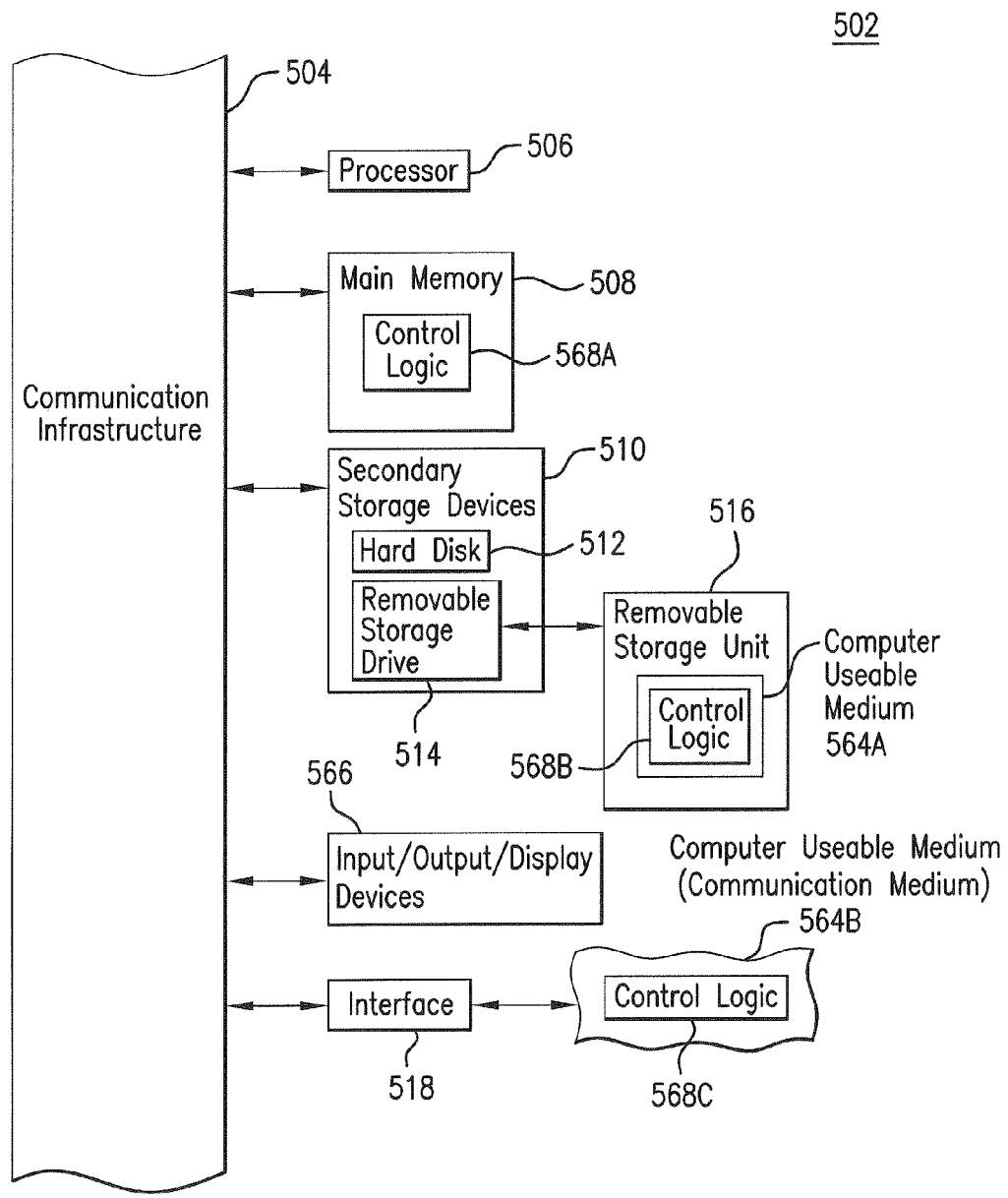
FIG. 5 illustrates an example computer useful for implementing components of the embodiments.

In an embodiment, the system and components of embodiments described herein are implemented using well known computers, such as example computer 502 shown in FIG. 5. For example, mobile device 110 can be implemented using computer(s) 502.

Computer 502 can be any commercially available and well known computer capable of performing the functions described herein, such as computers available from International Business Machines, Apple, Sun, HP, Dell, Compaq, Cray, etc.

Computer 502 includes one or more processors (also called central processing units, or CPUs), such as a processor 506. Processor 506 is connected to a communication infrastructure 504.

Computer 502 also includes a main or primary memory 508, such as random access memory (RAM). Primary memory 508 has stored therein control logic 568A (computer software), and data.

Computer 502 also includes one or more secondary storage devices 510. Secondary storage devices 510 include, for example, a hard disk drive 512 and/or a removable storage device or drive 514, as well as other types of storage devices, such as memory cards and memory sticks. Removable storage drive 514 represents a floppy disk drive, a magnetic tape drive, a compact disk drive, an optical storage device, tape backup, etc.

Removable storage drive 514 interacts with a removable storage unit 516. Removable storage unit 516 includes a computer useable or readable storage medium 564A having stored therein computer software 568B (control logic) and/or data. Removable storage unit 516 represents a floppy disk, magnetic tape, compact disk, DVD, optical storage disk, or any other computer data storage device. Removable storage drive 514 reads from and/or writes to removable storage unit 516 in a well known manner.

Computer 502 also includes input/output/display devices 566, such as monitors, keyboards, pointing devices, Bluetooth devices, etc.

Computer 502 further includes a communication or network interface 518. Network interface 518 enables computer 502 to communicate with remote devices. For example, network interface 518 allows computer 502 to communicate over communication networks or mediums 564B (representing a form of a computer useable or readable medium), such as LANs, WANs, the Internet, etc. Network interface 518 may interface with remote sites or networks via wired or wireless connections.

Control logic 568C may be transmitted to and from computer 502 via communication medium 564B.

Any tangible apparatus or article of manufacture comprising a computer useable or readable medium having control logic (software) stored therein is referred to herein as a computer program product or program storage device. This includes, but is not limited to, computer 502, main memory 508, secondary storage devices 510 and removable storage unit 516. Such computer program products, having control logic stored therein that, when executed by one or more data processing devices, cause such data processing devices to operate as described herein, represent the embodiments.

Embodiments can work with software, hardware, and/or operating system implementations other than those described herein. Any software, hardware, and operating system implementations suitable for performing the functions described herein can be used. Embodiments are applicable to both a client and to a server or a combination of both.

CONCLUSION

The Summary and Abstract sections may set forth one or more but not all exemplary embodiments as contemplated by the inventor(s), and thus, are not intended to limit the present embodiments and the appended claims in any way.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the embodiments should not be limited by any of the above-described exemplary embodiments, but should be defined only in accordance with the following claims and their equivalents.

What is claimed is:

1. A computer implemented method for view based streaming of geographical information system (GIS) data, comprising:
   receiving cache nodes in response to requests for a frame of data corresponding to a first view of the GIS data, wherein the cache nodes are associated with a requested view of GIS data and an initial priority value;
   updating the priority value assigned to one or more of the received cache nodes based upon a relevance of the corresponding cache nodes to a current view of the GIS data, wherein the current view is different from the first view, and, wherein the updated priority values differ from the initial priority values; and
   reordering the received cache nodes for processing based on the updated priority values,
   wherein the updating and the reordering are performed using one or more processors.

2. The method of claim 1, further comprising:
   identifying the cache nodes and their respective priority values based on a retrieval priority list.

3. The method of claim 1, the reordering further comprising:
   discarding one or more cache nodes.

4. A computer based system for view based streaming of geographical information system (GIS) data, comprising:

one or more processors coupled to a memory executing a GIS data manager, configured to:

receive, using the one or more processors, cache nodes in response to requests for a frame of data corresponding to a first view of the GIS data, wherein the cache nodes are associated with a requested view of GIS data and an initial priority value;

update the priority value assigned to one or more of the received cache nodes based upon a relevance of the corresponding cache nodes to a current view of the GIS data, wherein the current view is different from the first view, and wherein the updated priority values differ from the initial priority values; and reorder, using the one or more processors, the received cache nodes for processing based on the updated priority values.

5. The computer based system of claim 4, further configured to construct a retrieval priority list identifying the cache nodes and their respective priority values.

6. The computer based system of claim 4, further comprising a cache node engine configured to update a node tree and cache nodes.

7. The computer based system of claim 4, further comprising a renderer module configured to render a GIS view based on a view specification.

8. The computer based system of claim 4, further comprising a user interaction module configured to receive input that causes updates to a GIS view.

9. An article of manufacture including a non-transitory computer-readable medium having instructions stored thereon that, if executed by a computing device, cause the computing device to perform operations comprising:

receiving cache nodes in response to requests for a frame of data corresponding to a first view of the GIS data, wherein the cache nodes are associated with a requested view of geographical information system (GIS) data and an initial priority value;

updating the priority value assigned to one or more of the received cache codes based upon a relevance of the corresponding cache nodes to a current view of the GIS data, wherein the current view is different from the first view, and wherein the updated priority values differ from the initial priority values; and reordering the received cache nodes for processing based on the updated priority values.

10. The article of manufacture of claim 9, the operations further comprising:

identifying the cache nodes and their respective priority values based on a retrieval priority list.

11. The article of manufacture of claim 9, the reordering further comprising:

discarding one or more cache nodes.

12. A computer implemented method for view based streaming of geographical information system (GIS) data, comprising:

assigning initial priority values to cache nodes based on a first view of GIS data;

receiving cache nodes in response to requests for a frame of data, wherein the cache nodes are associated with a requested view of GIS data and the initial priority values;

updating the priority value assigned to one or more of the received cache nodes based upon a relevance of the corresponding cache nodes to a current view of the GIS data, wherein the current view is different from the first view, and wherein the updated priority values differ from the initial priority values; and reordering the received cache nodes for processing based on the updated priority values, wherein the updating and the reordering are performed using one or more processors.

13. The method of claim 12, further comprising:

discarding one or more cache nodes based on the relevance.

14. The method of claim 12, further comprising:

constructing a retrieval priority list identifying the cache nodes and their respective priority values.

15. The method of claim 12, wherein the providing comprises:

providing aggregated requests as hyper text markup language (HTTP) requests to the content server.

\* \* \* \* \*

UNITED STATES PATENT AND TRADEMARK OFFICE
CERTIFICATE OF CORRECTION

PATENT NO.          : 8,832,223 B1
APPLICATION NO.     : 13/028458
DATED               : September 9, 2014
INVENTOR(S)         : Kornmann et al.

It is certified that error appears in the above-identified patent and that said Letters Patent is hereby corrected as shown below:

In the Claims

Claim 1, Column 8, line 54 after the word "and" delete ","

Claim 9, Column 9, line 39 after the word "cache" delete "codes" and insert --nodes--

Signed and Sealed this
Tenth Day of February, 2015

Michelle K. Lee
*Deputy Director of the United States Patent and Trademark Office*